(12) United States Patent
Jechoux

(10) Patent No.: US 8,050,230 B2
(45) Date of Patent: Nov. 1, 2011

(54) VOWLAN ROAMING CONTROLLER WITH STATION PRE-AUTHENTICATION

(75) Inventor: Bruno Jechoux, Biot (FR)

(73) Assignee: Wipro Limited, Bangalore, Karnataka (IN)

( * ) Notice: Subject to any disclaimer, the term of this patent is extended or adjusted under 35 U.S.C. 154(b) by 792 days.

(21) Appl. No.: 11/774,569

(22) Filed: Jul. 7, 2007

(65) Prior Publication Data

US 2009/0010222 A1    Jan. 8, 2009

(51) Int. Cl.
*H04W 4/00* (2009.01)
(52) U.S. Cl. ......... 370/331; 370/341; 455/442; 455/436
(58) Field of Classification Search .................. 370/331, 370/341; 455/442, 436–439
See application file for complete search history.

(56) References Cited

U.S. PATENT DOCUMENTS

| | | | |
|---|---|---|---|
| 5,956,640 A | 9/1999 | Eaton et al. | |
| 6,094,565 A | 7/2000 | Alberth et al. | |
| 6,452,910 B1 | 9/2002 | Vij et al. | |
| 6,577,274 B1 | 6/2003 | Bajikar | |
| 6,747,598 B2 | 6/2004 | Bajikar | |
| 6,897,805 B2 | 5/2005 | Bajikar | |
| 7,010,305 B2 | 3/2006 | Immonen et al. | |
| 7,028,186 B1 | 4/2006 | Stenman et al. | |
| 7,039,027 B2 | 5/2006 | Bridgelall | |
| 7,095,748 B2 | 8/2006 | Vij et al. | |
| 7,107,620 B2 | 9/2006 | Haverinen et al. | |
| 7,127,258 B2 | 10/2006 | Zegelin | |
| 7,151,931 B2 | 12/2006 | Tsao et al. | |
| 2003/0133494 A1* | 7/2003 | Bender et al. | 375/130 |
| 2004/0203781 A1* | 10/2004 | Lefkowitz | 455/436 |
| 2007/0184838 A1* | 8/2007 | Van Der Velde et al. | 455/436 |

* cited by examiner

*Primary Examiner* — George Eng
*Assistant Examiner* — Jing Gao
(74) *Attorney, Agent, or Firm* — Prakash Nama; Global IP Services, PLLC

(57) ABSTRACT

A method of triggering handoff of a mobile station to a candidate BSS, for VoWLAN communication, uses a roaming controller for monitoring link qualities of the serving and candidate BSS by selective/controlled fast scanning through RSSI screening at each packet reception. Using link qualities, a list of candidate BSSs for handoff is maintained. The controller selects a candidate BSS for handoff and completes pre-authentication of the mobile station with the selected best candidate BSS. When the link quality of the of the selected candidate BSS becomes better than that of the serving BSS, handoff is triggered. Link qualities may be monitored by screening a metric other than RSSI. When no candidate BSS is found, scanning is reduced/temporarily interrupted, to conserve power. When the serving BSS link quality is above a given threshold when the mobile station is in the serving BSS center, the functions of fast scanning and pre-authentication are interrupted.

18 Claims, 4 Drawing Sheets

| Note |
|---|
| - TR1: inter-scanning period (4/5s) |
| - TR2: pre-authentication time out |
| - TR3: No BSS state time out (typically few tens of second or 1 min) |
| -Th_1: RSSI threshold below which the AP is supposed to be near the handoff zone |
| -RSSI is considered as the signal quality metric, however any other available metric could be used |
| -RSSI gap: RSSI variation gap |
| -RSSI_hyst: roaming hysteresis |
| -M_RSSI memorized RSSI |
| -M_RSSI2 memorized RSSI2 |
| -Fast scanning : Scanning of the best candidate channel only |
| -Best candidate : BSS showing the better radoio condition After the serving one (if no serving as in case of) Reconnection. Best candidate = best BSS) |

*Transition Event* → *Triggered Actions*

FIG. 1C

VOWLAN ROAMING CONTROLLER WITH STATION PRE-AUTHENTICATION

FIELD OF THE INVENTION

This invention generally relates to VoIP transmissions in mobile stations in the context of WLAN and WiFi, and more particularly to a method for triggering and performing handoff of mobile stations, and a roaming controller therefor that work efficiently in VoWLAN situations.

BACKGROUND OF THE INVENTION

In the deployment of wireless mobile stations, especially in VoWLAN roaming situations, seamless handover depends on solving a host of wireless access issues for the end user. Equipment and devices must be configured to negotiate many different frequencies, protocols, technologies, network types, regulatory environments and more, simultaneously not making the underlying complexity transparent to the end user, so as to ensure a truly seamless performance for the user.

It is known that VoWiFi (Voice over Wireless Fidelity) is generally a WiFi based VoIP service. Where VoIP consists of the hardware and software that enable people to use the internet as the transmission medium for telephone calls. VoWiFi is the wireless version of this technology which is designed to work on wireless devices such as a laptop of PDAs.

Many cellular phone companies such as Nokia® and Motorola® have already announced dual-mode cellular phones that will support seamless transaction from WiFi to cellular networks when WiFi is unavailable to a caller. One of the biggest challenges facing VoWiFi is effective roaming access. A WiFi access point offers a communication range of up to 90 meters (commonly called a hotspot), and continuous conversations would mean that the caller must stay within an area of overlapping hotspots, or as already suggested, have a VoWiFi dual-mode phone that would switch to a regular cellular phone transmission when the caller moves out of a hot spot range.

It is desirable to provide a roaming controller which is devoid of the issues in prior art in ensuring seamless roaming especially in VoWLAN situations.

SUMMARY OF THE INVENTION

The present invention provides an improved roaming controller that addresses seamless handover and efficient management of roaming issues in WoWLAN situations.

More particularly, for VoWLAN mobile stations/devices with roaming capability and seamless handoff needs (—necessary for enterprise and hot spot environment—), the present roaming controller aims to ensure that the mobile station is always associated with the best possible BSS (Base Station Subsystem), both in standby (idle) and active modes. The present roaming controller is configured to ensure that the handoff process is fast enough to provide a seamless transition during a call. These constraints generally do not apply for classical WiFi applications and such constraints are therefore out of the IEEE 802.11 standard scope (above MAC).

To achieve the above objectives, in one version of the invention, a roaming controller with pre-authentication keep alive and fast scanning is included in the WLAN management entity.

In one form, the invention resides in a method of triggering handoff of a roaming mobile station from a serving BSS to a candidate BSS, for VoWLAN communication, comprising the steps of: continuously monitoring link qualities of the serving BSS and the candidate BSS; generating and updating a list of candidate BSSs for handoff; selecting a candidate BSS for handoff and completing pre-authentication of the roaming mobile station with the selected best candidate BSS; and, triggering the handoff when the link quality of the serving BSS becomes lower by a predetermined amount than the link quality of the selected candidate BSS. Advantageously, the method uses a roaming controller for performing scanning and said monitoring functions. Preferably the roaming controller performs a static keep alive function to maintain pre-authentication with said selected candidate BSS as the best candidate BSS. The method might include the step of the roaming controller selectively limiting said scanning function to conserve power. In one form of the invention, the method includes the step of monitoring the link qualities screening RSSI (Received Signal Strength Indicator) at each packet reception.

In a second form, the invention resides in a method of managing handoff of a roaming mobile station from a serving AP (Access Point) to a candidate in multi AP environment for VoWLAN communications, comprising the steps of: monitoring link quality of the serving AP and a candidate AP by selective active scanning of received packet analysis; generating and updating a list of candidate APs for handoff from a serving AP, and selecting a best candidate for handoff; performing pre-authentication of the mobile station with the best candidate AP, and keeping alive the pre-authentication before handoff; and, completing handoff to the selected best candidate AP when the mobile station is in a handoff region.

The invention in another form resides in a method of triggering handoff of a roaming mobile station from a serving BSS to a candidate BSS, for VoWLAN communication, comprising the steps of: continuously monitoring link qualities of the serving BSS and the candidate BSS by selective and controlled fast scanning through RSSI screening at each packet reception; based on monitored link qualities, generating and updating a list of candidate BSSs for handoff; selecting a candidate BSS for handoff and completing pre-authentication of the roaming mobile station with the selected best candidate BSS; and, triggering the handoff when the link quality of the serving BSS becomes lower by a predetermined amount than the link quality of the selected candidate BSS. The invention also includes a computer readable medium encoded with data/instruction which when executed by a computing platform results in execution of any method as recited above.

BRIEF DESCRIPTION OF THE DRAWING

A more detailed understanding of the invention may be had from the following description of preferred embodiments, given by way of example and to be understood in conjunction with the accompanying drawing wherein.

DETAILED DESCRIPTION

Figure 1:
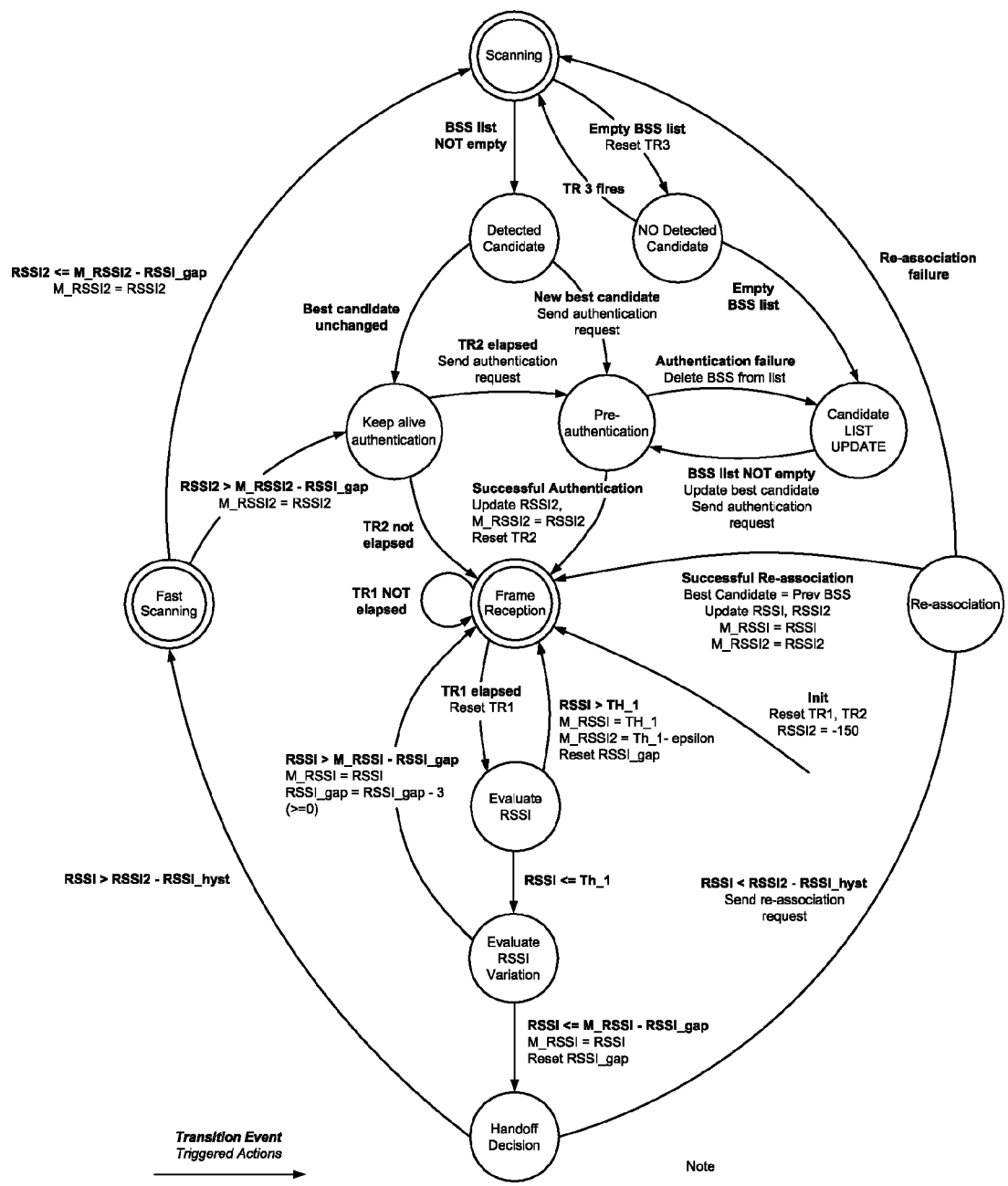
FIG. 1 (comprising FIG. 1A, FIG. 1B and FIG. 1C) illustrates a flow chart of an exemplary roaming controller state machine.
Figure 1A:
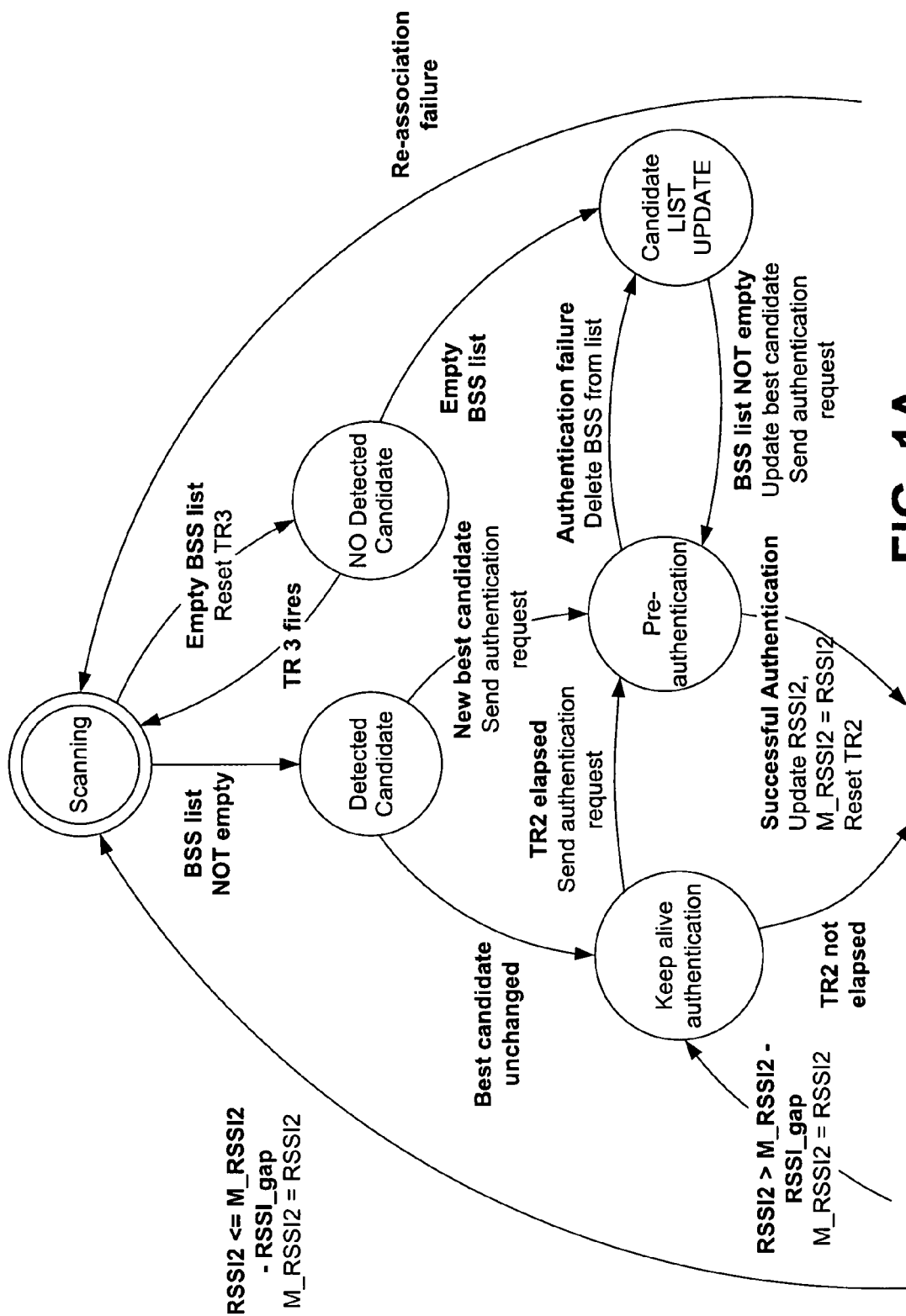
Figure 1B:
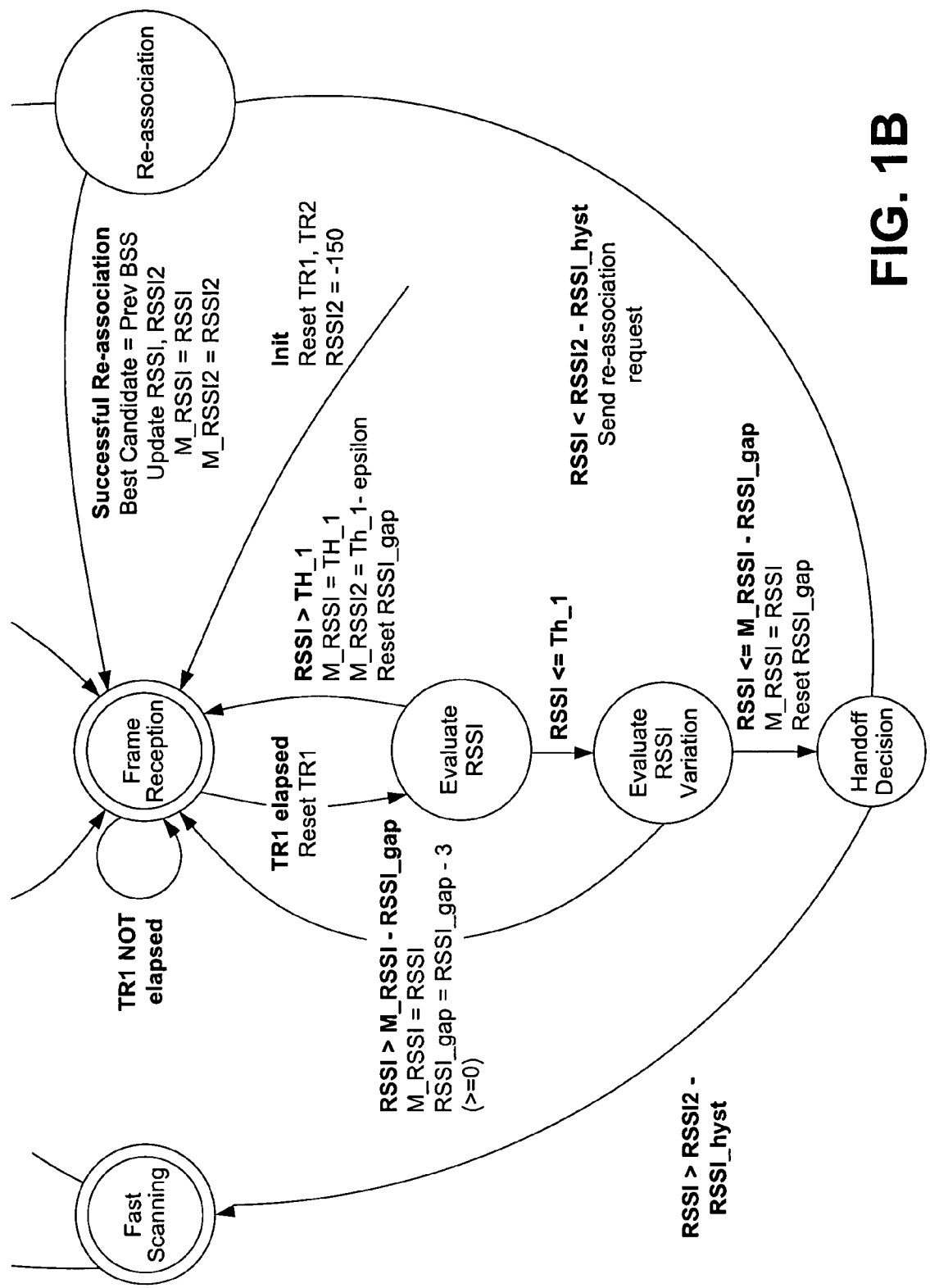

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims, and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

In certain previous solutions to the handoff problem, typically, no fast scanning was implemented, and any scanning that was used was controlled at the host level, in compliance with host application requirements.

Advantageously, one version of the present roaming controller performs:
  Continuous monitoring of serving BSS link quality, and triggered monitoring of the candidate BSS link quality,
  Generation and update of a list of candidate BSSs for handoff,
  Pre-authentication of the STA with a new BSS before handoff,
  Pre-authentication (identification) keep alive, and,
  Handoff (re-association) through RSSI screening at each packet reception.

In addition, in the present roaming controller, fast scanning is implemented to reduce as much as possible the energy consumption due to the increased amount of scanning performed. Also, expediently, the present approach selectively uses an algorithm to achieve fast scanning and a drastic reduction in power consumption. The algorithm objectives are to trigger the handoff as soon as the link quality on serving BSS becomes significantly lower than the best candidate link quality, some hysteresis is applied to avoid ping pong effect, while minimizing the amount of energy consumed for scanning (via thresholding and fast scanning). In addition it performs a static keep alive function to maintain pre-authentication with the best candidate BSS as long as it is in the handoff zone.

In one implementation of the invention, the key assumptions are that:
roaming may happen on the edge of the cell but is very unlikely in the BSS center (near the AP), whereby monitoring the candidate BSS link quality, establishing or maintaining pre-authentication with the candidate BSS while in the serving BSS center is not very useful;
once on the edge of the BSS, the maximum inter-scanning period must be considered and accepted as imposed by mobility;
the amount of scanning must be as limited as possible, and in many cases best candidate BSS scanning is sufficient; and, when no BSS is found, the scanning effort must be limited and reasonable (—for example, time out before re-scanning—).
Note 1: The inter scanning maximum period is about 5 s (mobility constraint), while the authentication time out is undefined and implementation dependent. However the later is expected to be longer than 5 s in any case.
Note 2: RSSI is used here only as an example, and it could be replaced by any other link quality metric.
Note 3: Any reference to BSS could be replaced a reference to a BSS ID implying roaming between multiple APs of the same BSS (Extended Service Set as per IEEE 802.11 definition.

RSSI is compared to a low level threshold below which the station is assumed to be on the edge of the BSS, where handoffs may occur. In this area, the station pre-authenticates with the best candidate BSS to prepare a smooth handoff. It is noted that the RSSI value and variation for both the serving BSS (RSSI) and the best candidate BSS (RSSI 2) are monitored periodically in order to:
  trigger handoff from serving BSS to best candidate when RSSI 2 becomes significantly higher than RSSI, and,
  trigger a full scanning to update the best candidate BSS and pre-authenticate when both RSSI and RSSI 2 decrease.

The following description should be understood in the context of the state machine illustrated in the FIG. 1 chart (The terms "station" and STA are used herein synonymously):

The state machine permanently ensures that as soon as the STA is in the handover region (i.e. sufficiently far form the serving AP according to RSSI value compared to Th_1),
  a best candidate (if any) is selected,
  the STA is and stays pre-authenticated with the best candidate while served by the serving BSS, and,
  the STA quickly performs handover as soon as the link quality on best candidate (RSSI 2) is higher than on the serving BSS (RSSI).

The following events/steps should b understood with further reference to the FIG. 1 flow chart:
  Scanning, fast scanning and Frame reception are macro states inside which several actions may be performed. Frame reception is the only stable state; all the other states are transient.
  The transient states can be split into 3 categories related to their objectives:
    update the BSS list: Scanning, Fast scanning, Detected candidate, NO detected candidate, Candidate list update.
    Initiate and maintain if necessary the pre-authentication with the best candidate BSS: Pre-authentication, keep alive authentication.
    Perform handover when appropriate: Evaluate RSSI. Evaluate RSSI variation. Handoff decision, Re-association.
  Scanning state corresponds to the classical search process for the existing BSS, i.e., this process generates a list of all BSSs which were heard in a given period on a pre-defined set of frequency channels.
  Fast scanning performs a simple update of the RSSI (Received Signal Strength Indicator) value of the AP signal of the best candidate BSS. It can either actively perform a scan on this specific BSS ID/frequency channel or exploit the reception of any packet transmitted by this AP (to any destination).
  Frame reception is the default state of the device which evaluates the triggering events only at frame reception time.
  Keep alive authentication decides if pre-authentication with the best candidate needs to be performed to ensure that the STA stays pre-authenticated with it.
  Pre-authentication handles the pre-authentication process and may update the BSS list and best candidate RSSI values (RSSI 2).
  Detected candidate updates the Best candidate in the BSS list.
  NO detected candidate and candidate list update serve to trigger BSS list update and trigger scanning if the BSS list if empty.
  Evaluate RSSI compares the current RSSI (from the serving BSS) with a pre-defined threshold. It triggers the Evaluate RSSI variation state only when the RSSI is below the threshold, i.e., when the STA is sufficiently far from the serving AP to be likely to perform handover.
  Evaluate RSSI variation compares the current RSSI (from the serving BSS) with the previously memorized one. It evaluates the serving link degradation to decide if a handover must be considered.
  Handoff Decision decides to "go for handover or not", based on comparison between serving BSS RSSI and best candidate RSSI (RSSI 2). Best candidate pre-authentication is a prerequisite in the example described herein.

Re-association effectively performs the handover.

Further, fast scanning is indicated where only the best candidate channel is scanned. The roaming state machine exploits serving BSS RSSI measurements, namely RSSI and best candidate BSS RSSI measurements, namely RSSI 2, to switch to no scanning, fast scanning or normal scanning (preferably active scanning). It is based on the fact that when roaming from serving BSS to the best candidate BSS, the STA should experience an increasing RSSI 2 and a decreasing RSSI. If RSSI and RSSI 2 decrease together, it is very likely that the STA is roaming between the serving BSS and a $3^{rd}$ BSS. In this case, it is necessary to perform normal scanning to reselect a best candidate. Any frame received from the best candidate BSS can be used to provide fast scanning functionality (e.g., authentication response).

The following are some of the features of the present roaming controller:

The station can maintain autonomously its connection to the best BSS at its location which is desirable to allow VoIP incoming call reception in a multi AP environment (hot spot, enterprise) with minimal power consumption impact. The power consumption is minimized owing to thresholding and fast scanning. The implementation of the roaming controller as described herein deals with the handover at STA side providing an optimized way to perform roaming between APs (applying WDS or not) while limiting the amount of energy consumption.

Compared to existing roaming procedures where the STA periodically updates the list of candidate BSSs or APs via scanning and performs full roaming process in one attempt at a time it is required, the present approach provides several key advantages:

- pre-authentication, allowing faster, generally seamless, handover since the authentication process (encryption key exchanges) is performed in advance, thus reducing the handover time;
- keep alive mechanism, ensuring that the STA stays authenticated with the best candidate AP (the best candidate for roaming to) as long as it is in the handover region; and,
- fast scan mechanism, allowing selective scanning of the best candidate (via active scanning of received packet analysis) thus reducing drastically the power consumption cost of the scanning.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, handheld devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics, processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., where used are merely labels, and are not intended to impose numerical requirements on their objects.

The invention claimed is:

1. A method of triggering handoff of a roaming mobile station from a serving BSS to a candidate BSS for VoWLAN communication, comprising the steps of:
   continuously monitoring link qualities of the serving BSS and the candidate BSS;
   generating and updating a list of candidate BSSs for handoff;
   selecting a candidate BSS for handoff and completing pre-authentication of the roaming mobile station with a selected best candidate BSS;
   triggering the handoff when the link quality of the serving BSS becomes lower by a predetermined amount than the link quality of the selected candidate BSS;
   using a roaming controller for performing scanning and said monitoring functions, wherein said roaming controller performs a static keep alive function to maintain pre-authentication with said selected candidate BSS as the best candidate BSS, and wherein said roaming controller chooses a scanning functionality comprising:

using a fast scanning functionality by scanning only frames received from the best candidate BSS if the link quality of the serving BSS decreases and the link quality of the best candidate BSS increases while roaming; and using a normal scanning functionality to reselect the best candidate BSS if the link quality of the serving BSS decreases and the link quality of the best candidate BSS decreases while roaming; and interrupting the scanning temporarily if no candidate BSS is immediately found before scanning resumes, wherein no scanning occurs for a defined inter-scanning maximum period.

2. The method as in claim 1 wherein said step of monitoring the link qualities comprises screening RSSI at each packet reception.

3. The method as in claim 1 including the step of the roaming controller selectively limiting said scanning function to conserve power.

4. The method as in claim 1 wherein said step of continuously monitoring said link qualities comprises monitoring a chosen link quality metric.

5. The method as in claim 2 wherein the step of monitoring comprises measuring a first RSSI with a serving BSS and measuring a second RSSI-2 with a candidate BSS, and when both RSSI and RSSI 2 decrease, the roaming controller performing a full scanning to update best candidate BSS and do pre-authentication.

6. The method as in claim 1 wherein said pre-authentication might include encryption key exchanges.

7. The method as in claim 6 implemented as part of management layer in low power applications.

8. A method of managing handoff of a roaming mobile station from a serving AP to a candidate in multi AP environment for VoWLAN communications, comprising the steps of:

monitoring link quality of the serving AP and a candidate AP by selective active scanning of received packet analysis;

generating and updating a list of candidate APs for handoff from a serving AP, and selecting a best candidate AP for handoff;

performing pre-authentication of the mobile station with said best candidate AP, and keeping alive the pre-authentication before handoff;

completing handoff to the selected best candidate AP when the mobile station is in a handoff region;

using a roaming controller for performing said active scanning and said monitoring functions, wherein an AP might comprise a BSS, and wherein said roaming controller performs a static keep alive function to maintain pre-authentication with said selected candidate BSS as the best candidate BSS, and wherein said roaming controller chooses a scanning functionality comprising:

using a fast scanning functionality by scanning only frames received from the best candidate BSS if the link quality of the serving BSS decreases and the link quality of the best candidate BSS increases while roaming; and using a normal scanning functionality to reselect the best candidate BSS if the link quality of the serving BSS decreases and the link quality of the best candidate BSS decreases while roaming; and interrupting said active scanning temporarily if no candidate BSS is immediately found before scanning resumes, wherein no scanning occurs for a defined inter-scanning maximum period.

9. The method as in claim 8 wherein said step of monitoring the link qualities comprises screening RSSI at each packet reception.

10. The method as in claim 8 including the step of the roaming controller selectively limiting said scanning function to conserve power.

11. The method as in claim 8 wherein said step of monitoring link quality and scanning is limited to the serving BSS when the link quality of the serving BSS is above a given threshold, whereby the mobile station is considered to be in the serving BSS center.

12. The method as in claim 8 wherein said step of continuously monitoring said link qualities comprises monitoring a chosen link quality metric.

13. The method as in claim 9 wherein the step of monitoring comprises measuring a first RSSI with a serving BSS and measuring a second RSSI 2 with a candidate BSS, and when both RSSI and RSSI 2 decrease, the roaming controller performing a full scanning to update best candidate BSS and do pre-authentication.

14. The method as in claim 8 wherein said pre-authentication might include encryption key exchanges.

15. The method as in claim 14 implemented as part of management layer in low power applications.

16. A method of triggering handoff of a roaming mobile station from a serving BSS to a candidate BSS for VoWLAN communication, comprising the steps of:

continuously monitoring link qualities of the serving BSS and the candidate BSS by selective and controlled fast scanning through RSSI screening at each packet reception;

based on monitored link qualities, generating and updating a list of candidate BSSs for handoff;

selecting a candidate BSS for handoff and completing pre-authentication of the roaming mobile station with the selected best candidate BSS;

triggering the handoff when the link quality of the serving BSS becomes lower by a predetermined amount than the link quality of the selected candidate BSS;

using a roaming controller for performing scanning and said monitoring functions, wherein said roaming controller performs a static keep alive function to maintain pre-authentication with said selected candidate BSS as the best candidate BSS, and wherein said roaming controller chooses a scanning functionality comprising:

using a fast scanning functionality by scanning only frames received from the best candidate BSS if the link quality of the serving BSS decreases and the link quality of the best candidate BSS increases while roaming; and using a normal scanning functionality to reselect the best candidate BSS if the link quality of the serving BSS decreases and the link quality of the best candidate BSS decreases while roaming; and interrupting the scanning temporarily if no candidate BSS is immediately found before scanning resumes, wherein no scanning occurs for a defined inter-scanning maximum period.

17. A computer memory element encoded with data/instruction which when executed by a computing platform results in execution of a method as in claim 1.

18. A computer memory element encoded with data/instruction which when executed by a computing platform results in execution of a method as in claim 8.

* * * * *